(12) United States Patent
Stamm

(10) Patent No.: US 9,212,561 B2
(45) Date of Patent: *Dec. 15, 2015

(54) LAYER SYSTEM COMPRISING AN NICOCRALY DOUBLE PROTECTIVE LAYER WITH DIFFERING CHROMIUM CONTENT AND ALLOY

(71) Applicant: SIEMENS AKTIENGESELLSCHAFT, München (DE)

(72) Inventor: Werner Stamm, Mülheim an der Ruhr (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/924,818

(22) Filed: Jun. 24, 2013

(65) Prior Publication Data
US 2014/0011049 A1  Jan. 9, 2014

(30) Foreign Application Priority Data

Jul. 5, 2012 (EP) .................................. 12175132

(51) Int. Cl.
*B32B 15/04* (2006.01)
*F01D 5/28* (2006.01)
(Continued)

(52) U.S. Cl.
CPC . *F01D 5/288* (2013.01); *C22C 1/02* (2013.01); *C23C 28/02* (2013.01); *C23C 28/021* (2013.01); *C23C 28/022* (2013.01); *C23C 28/30* (2013.01); *C23C 30/00* (2013.01); *C23C 30/005* (2013.01);

(Continued)

(58) Field of Classification Search
CPC ...... B32B 15/01; B32B 15/016; B32B 15/04; B32B 15/043; B32B 15/20; C23C 28/02; C23C 28/021; C23C 30/00; C23C 28/30; C23C 28/00; C23C 28/022; C23C 4/085; C23C 28/3215; C23C 28/321; C23C 30/005; C22C 19/05; C22C 19/055; C22C 19/056; C22C 19/07; C22C 30/00; C22C 1/02; Y10T 428/12611; Y10T 428/12944; Y10T 428/12778; Y10T 428/12618; Y10T 428/24967; Y10T 428/263; Y10T 428/264; Y10T 428/12931; Y10T 428/12937
USPC ......... 428/629, 630, 631, 632, 633, 656, 680, 428/678, 679, 548, 332, 334; 420/435, 436, 420/437, 441, 442, 443, 445, 460, 588
See application file for complete search history.

(56) References Cited

U.S. PATENT DOCUMENTS 6,024,792 A      2/2000   Bieler
2008/0026242 A1* 1/2008   Quadakkers et al. ......... 428/551
(Continued)

FOREIGN PATENT DOCUMENTS

EP         0486489 B1    11/1994
EP         0412397 B1    3/1998
(Continued)

*Primary Examiner* — Michael E La Villa

(57) ABSTRACT

A two-layered NiCoCrAlY layer is provided. The layer includes a bottom and a top layer. Through the use of a two-layered NiCoCrAlY layer, it is possible to reduce the formation of cracks in the thermally grown oxide layer as forms on account of the protective action of the NiCoCrAlY layers.

13 Claims, 2 Drawing Sheets

(51) Int. Cl.
  *B32B 15/20* (2006.01)
  *C23C 28/02* (2006.01)
  *C23C 30/00* (2006.01)
  *C23C 28/00* (2006.01)
  *C22C 1/02* (2006.01)

(52) U.S. Cl.
  CPC .. *Y10T 428/12611* (2015.01); *Y10T 428/12618* (2015.01); *Y10T 428/12778* (2015.01); *Y10T 428/12931* (2015.01); *Y10T 428/12937* (2015.01); *Y10T 428/12944* (2015.01); *Y10T 428/24967* (2015.01); *Y10T 428/263* (2015.01); *Y10T 428/264* (2015.01)

(56) References Cited

U.S. PATENT DOCUMENTS

| | | | |
|---|---|---|---|
| 2008/0160269 A1* | 7/2008 | Stamm | 428/212 |
| 2010/0143745 A1* | 6/2010 | Stamm | 428/615 |
| 2011/0189502 A1* | 8/2011 | Schmitz et al. | 428/632 |
| 2011/0287269 A1* | 11/2011 | Stamm | 428/450 |
| 2015/0030876 A1* | 1/2015 | Stamm | 428/632 |

FOREIGN PATENT DOCUMENTS

| | | |
|---|---|---|
| EP | 0892090 A1 | 1/1999 |
| EP | 0786017 B1 | 3/1999 |
| EP | 1306454 A1 | 5/2003 |
| EP | 1319729 A1 | 6/2003 |
| EP | 1204776 B1 | 6/2004 |
| EP | 1816222 A1 | 8/2007 |
| EP | 1845171 A1 | 10/2007 |
| EP | 1925687 A1 | 5/2008 |
| EP | 2216421 A1 | 8/2010 |
| WO | WO 9967435 A1 | 12/1999 |
| WO | WO 0044949 A1 | 8/2000 |
| WO | WO 2011/103927 * | 9/2011 |

* cited by examiner

FIG 3

| Material | C | Cr | Ni | Co | Mo | W | Ta | Nb | Al | Ti | B | Zr | Hf |
|---|---|---|---|---|---|---|---|---|---|---|---|---|---|
| Ni-based investment casting alloys | | | | | | | | | | | | | |
| GTD 222 | 0.10 | 22.5 | Rem. | 19.0 | | 2.0 | 1.0 | 0.8 | 1.2 | 2.3 | 0.008 | 0.10 | |
| IN 939 | 0.15 | 22.4 | Rem. | 19.0 | | 2.0 | 1.4 | 1.0 | 1.9 | 3.7 | 0.009 | 0.10 | |
| IN 6203 DS | 0.15 | 22.0 | Rem. | 19.0 | | 2.0 | 1.1 | 0.8 | 2.3 | 3.5 | 0.010 | 0.10 | 0.15 |
| Udimet 520 | 0.10 | 19.0 | Rem. | 19.5 | 4.0 | | | | 2.0 | 2.9 | 0.005 | 0.05 | |
| IN 738 LC | 0.10 | 16.0 | Rem. | 8.5 | 1.7 | 2.6 | 1.7 | 0.9 | 3.4 | 3.4 | 0.010 | 0.10 | |
| SC 16 | <0.01 | 16.0 | Rem. | | 3.0 | | 3.5 | | 3.5 | 3.5 | <0.005 | <0.004 | |
| Rene 80 | 0.17 | 14.0 | Rem. | 9.5 | 4.0 | 4.0 | | | 3.0 | 5.0 | 0.015 | 0.03 | |
| GTD 111 | 0.10 | 14.0 | Rem. | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rem. | 9.0 | 1.9 | 4.1 | 4.1 | | 3.4 | 3.8 | 0.015 | 0.02 | 1.00 |
| IN 792 DS | 0.08 | 12.5 | Rem. | 9.0 | 1.9 | 4.1 | 4.1 | | 3.4 | 3.8 | 0.015 | 0.02 | 1.50 |
| MAR M 002 | 0.15 | 9.0 | Rem. | 10.0 | | 10.0 | 2.5 | | 5.5 | 1.5 | 0.015 | 0.05 | 1.40 |
| MAR M 247 LC DS | 0.07 | 8.1 | Rem. | 9.2 | 0.5 | 9.5 | 3.2 | | 5.6 | 0.7 | 0.015 | 0.02 | 1.40 |
| CMSX-2 | <0.006 | 8.0 | Rem. | 4.6 | 0.6 | 8.0 | 6.0 | | 5.6 | 1.0 | <0.003 | <0.0075 | 0.10 |
| CMSX-3 | <0.006 | 8.0 | Rem. | 4.6 | 0.6 | 8.0 | 6.0 | | 5.6 | 1.0 | <0.003 | <0.0075 | 0.10 |
| CMSX-4 | <0.006 | 6.5 | Rem. | 9.0 | 0.6 | 6.0 | 6.0 | | 5.6 | 1.0 | <0.003 | Re=3.0 | 0.10 |
| CMSX-6 | <0.015 | 10.0 | Rem. | 5.0 | 3.0 | <0.10 | 2.0 | <0.10 | 4.8 | 4.8 | <0.003 | <0.0075 | 0.10 |
| PWA 1480 SX | <0.006 | 10.0 | Rem. | 5.0 | | 4.0 | 12.0 | | 5.0 | 1.5 | <0.0075 | <0.0075 | |
| PWA 1483 SX | 0.07 | 12.2 | Rem. | 9.0 | 1.9 | 3.8 | 5.0 | | 3.6 | 4.2 | 0.00001 | 0.022 | |
| Co-based investment casting alloys | | | | | | | | | | | | | |
| FSX 414 | 0.25 | 29.0 | 10 | Rem. | | 7.5 | | | | | 0.010 | | |
| X 45 | 0.25 | 25.0 | 10 | Rem. | | 8.0 | | | | | 0.010 | | |
| ECY 768 | 0.35 | 24.0 | 10 | 53.7 | | 7.5 | 4.0 | | 0.25 | 0.3 | 0.010 | 0.05 | |
| MAR M 509 | 0.85 | 24.0 | 11 | | | 7.5 | 4 | | | 0.2 | 0.010 | 0.50 | |
| CM 247 | 0.07 | 8.3 | Rem. | 10.0 | 0.5 | 9.5 | 3.2 | | 5.5 | 0.7 | 0.020 | | 1.5 |

LAYER SYSTEM COMPRISING AN NICOCRALY DOUBLE PROTECTIVE LAYER WITH DIFFERING CHROMIUM CONTENT AND ALLOY

CROSS REFERENCE TO RELATED APPLICATIONS

The present application claims priority to European Patent Office application No. 12175132.5 EP filed Jul. 5, 2012, the entire content of which is hereby incorporated herein by reference.

FIELD OF INVENTION

The invention relates to a layer system comprising a two-layered NiCoCrAlY layer, in which the susceptibility to cracking in the thermally grown oxide layer (TGO) is reduced, and to an alloy therefor.

BACKGROUND OF INVENTION

In the hot-gas path of gas turbines, nickel-based and cobalt-based materials are used. Owing to their optimization to the highest possible strength, however, these materials often do not have sufficient resistance to oxidation and high-temperature corrosion in the hot gas. Therefore, the materials have to be protected from attack by the hot gas using suitable protective coatings. To increase the turbine inlet temperature, a ceramic layer based on zirconium oxide is also additionally applied to components subject to extremely high thermal stresses for thermal insulation. The realization of the highest possible operating temperatures and a long service life of the components which are exposed to hot gas requires an optimally adapted protective layer system consisting of a bonding layer and a thermal barrier coating. The composition of the bonding layer here is of central importance.

To solve this problem, protective layers are applied to the hottest components in part also as a bonding layer for a thermal barrier coating. These generally consist of what are known as NiCoCrAlY covering layers, which, in addition to nickel and/or cobalt, can also contain chromium, aluminum, silicon, rhenium, tantalum and rare earth elements such as yttrium, hafnium and the like. However, further increasing surface temperatures on the protective layer can lead to damage, which results in failure of the layer or in spalling of the thermal barrier coating. Rhenium has often been used.

However, rhenium has the disadvantage that its content considerably increases the costs. This has been particularly significant in the past few years and will also play a major role in the future.

Given increasing temperatures of the layer surface or for longer service lives of the protective layers, it is necessary to develop suitable protective layers which, under these boundary conditions, have improved oxidation resistance combined with a sufficiently good thermomechanical resistance and at the same time lower costs than rhenium-containing layers. This can be achieved only by a very balanced chemical composition of the protective layer. Here, the elements Ni, Co, Cr, Al and Y are particularly important.

The fact that these elements also interact with the base material owing to diffusion must also be taken into great consideration.

SUMMARY OF INVENTION

It is an object of the invention, therefore, to solve the aforementioned problem.

The object is achieved by a layer system as claimed in the claims and an alloy as claimed in the claims.

The dependent claims list further advantageous measures which can be combined with one another, as desired, in order to obtain further advantages.

The description and the figures represent only exemplary embodiments of the invention.

In general, it is assumed that, owing to the relatively great interdiffusion of chromium from the layer into the base material, which generally has a lower chromium content than the layer, the difference between the chromium contents in the layer and the base material should not be greater than approximately 5%. Otherwise, a more or less severe Kirkendall porosity will arise, leading to premature failure of the layer assembly with the base material. This has been confirmed by model calculations carried out appropriately. This behavior has been confirmed experimentally, as proven by the comparison of layers having a low chromium content and a high chromium content on IN 738 LC.

On the other hand, for the upper limit of the chromium content of the layer, it should be taken into account that, given low chromium contents of approximately 13% by weight chromium (Cr) in the layer, spinel formation with multiple cracking often arises at the surface, likewise leading to a shortened service life of the protective layer system. Although a very balanced composition of the protective layer already leads to good results, this does not yet constitute the optimum.

For the reasons mentioned above, a solution has been sought which combines all the advantages.

The solution proposed here presents a combination of layer compositions as a duplex layer, which, compared to layer compositions to date, has improvements in terms of the aforementioned problems.

What is proposed is a protective layer which, compared to the layers used to date, has better oxidation resistance and good thermomechanical properties and, on account of the substitution of rhenium, has considerable cost benefits. In addition, the interdiffusion behavior is said to be the same or better. In contrast to conventional layer compositions, the top layer of the duplex layer has chromium contents of >20% chromium, in particular >22% chromium (Cr). This avoids spinel formation and multiple cracking in the TGO. The higher chromium (Cr) content in the topmost layer has two reasons: on the one hand, despite evaporation of chromium (Cr) during the solution annealing treatment, enough chromium (Cr) remains present in the topmost layer in order to keep the activity of aluminum high, and on the other hand the chromium serves as a nucleating agent for stable alpha-aluminum oxide.

The bottom layer (boundary layer to the base material) of the duplex layer has by contrast a considerably lower chromium content, preferably of 12% by weight to 14% by weight chromium (Cr). This prevents a Kirkendall porosity which reduces the service life at the interface with the base material.

The other constituents of the layers are based on optimized proportions of nickel (Ni), cobalt (Co), aluminum (Al), rare earth elements (Y, . . . ) and the like, but no rhenium (Re).

EXAMPLE

Duplex protective layer comprises at least:
a bottom NiCoCrAlY layer (10):
an NiCoCrAlY protective layer having the composition (in % by weight) of
Ni content: remainder
cobalt (Co): 24%-25.5%, chromium (Cr): 12%-14%,
aluminum (Al): 10.0%-12.0%, in particular 11.0%,
yttrium (Y): 0.2%-0.4%, in particular 0.3%
Moderately high Co content:
broadening of the beta/gamma field, avoidance of brittle phases
Average Cr content:
low enough to avoid brittle phases (alpha-chromium or sigma phase) and to avoid Kirkendall porosity and nevertheless to preserve the protective action over long periods of time
Moderately high Al content:
sufficiently high to additionally deliver Al to preserve a stable TGO. Low enough to achieve good ductility and to avoid tendency toward embrittlement
Low Y content:
sufficiently high to still form sufficient Y aluminate for forming Y-containing pegs with low oxygen contamination
low enough to negatively accelerate the oxide layer growth of the $Al_2O_3$ layer,
and also a top NiCoCrAlY layer (13):
an NiCoCrAlY protective layer having the composition (in % by weight) of
Ni content: remainder
cobalt (Co): 24%-25.5%,
chromium (Cr): 23%-25%, preferably 24%,
aluminum (Al): 9.5%-11.5%, preferably 10.5%,
yttrium (Y): 0.2%-0.4%, preferably 0.3%
High Cr content:
to avoid spinel and multiple cracking in the TGO and improve the oxide layer formation of $Al_2O_3$ with low oxidation rates
Moderately high Al content:
the Al content is lowered slightly compared to the bottom layer in order to minimize impairment of the ductility by the high Cr content.

The NiCoCrAlY layers/alloys can also comprise further elements, other or further rare earth elements or Ta, Ti, Fe, . . . , but no rhenium (Re).

No chromizing of an individual layer is carried out for the top NiCoCrAlY layer 13, and therefore there is also no chromium gradient present, because a uniform powder is used in order to apply the layer.

Thermodynamic phase calculations and also test results for the respective individual layer have shown that good results are present in terms of oxidation, formation of the TGO and the mechanical properties.

The overall layer thickness of the metallic layer 7 on the substrate should preferably be 180 μm to 300 82 m.

The bottom layer 7 is preferably sprayed with a fine powder and the top layer 13 consists of the powder having a high chromium content with a relatively coarse powder fraction, in order to provide not only the improved oxide layer formation but also the required high roughness of $R_a$=9 μm to 14 μm for optimum bonding for a ceramic layer.

This procedure also has the advantage that no new cost-increasing process step is necessary.

BRIEF DESCRIPTION OF THE DRAWINGS

FIG. 3 shows a list of superalloys.

DETAILED DESCRIPTION OF INVENTION

Figure 1:
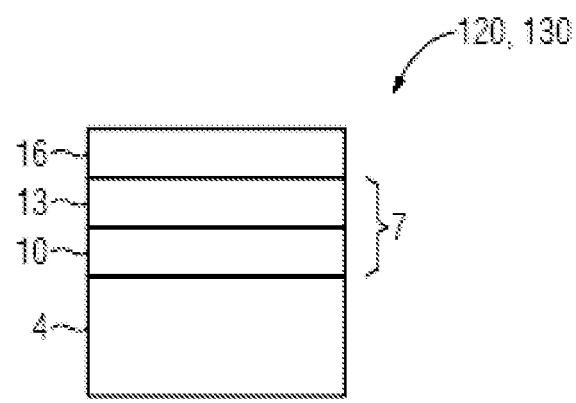
FIG. 1 shows a layer system.

FIG. 1 shows a layer system consisting of a substrate 4 and the two-layered NiCoCrAlY layer 7, which is composed of two different layer compositions 10, 13.

A ceramic thermal barrier coating 16 is optionally on the outer NiCoCrAlY layer 13.

Nickel-based or cobalt-based superalloys, in particular alloys as shown in FIG. 3, can be used as the substrate 4.

Figure 2:
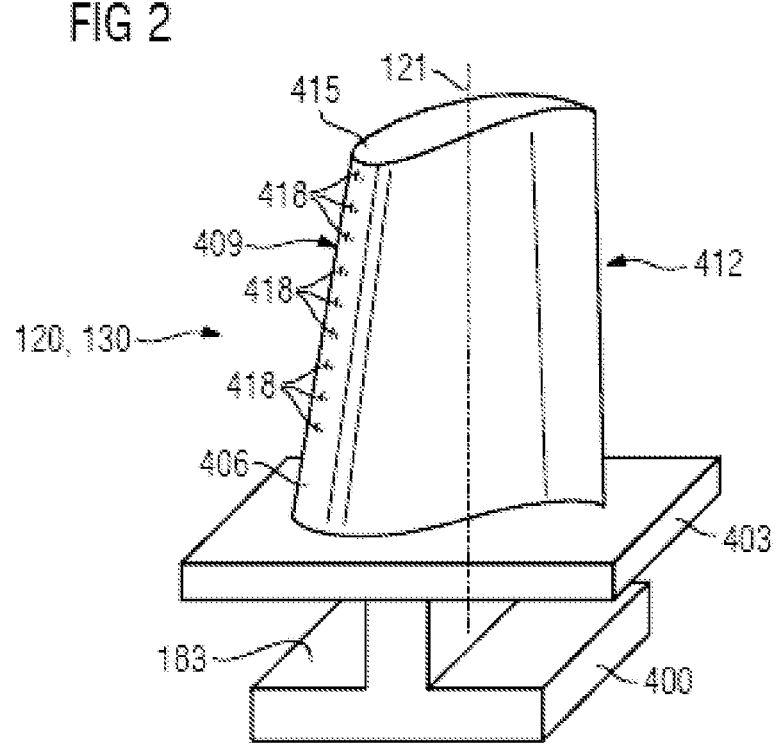
FIG. 2 shows a turbine blade or vane.

FIG. 2 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406 and a blade or vane tip 415.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949.

The blade or vane 120, 130 may in this case be produced by a casting process, by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024,792 and EP 0 892 090 A1.

The blades or vanes 120, 130 may likewise have coatings protecting against corrosion or oxidation e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (Hf). Alloys of this type are known from EP 0 486 489 B1, EP 0 786 017 B1, EP 0 412 397 B1 or EP 1 306 454 A1.

The density is preferably 95% of the theoretical density.

A protective aluminum oxide layer (TGO=thermally grown oxide layer) is formed on the MCrAlX layer (as an intermediate layer or as the outermost layer).

The layer preferably has a composition Co-30Ni-28Cr-8Al-0.6Y-0.7Si or Co-28Ni-24Cr-10Al-0.6Y. In addition to these cobalt-based protective coatings, it is also preferable to use nickel-based protective layers, such as Ni-10Cr-12Al-0.6Y-3Re or Ni-12Co-21Cr-11Al-0.4Y-2Re or Ni-25Co-17Cr-10Al-0.4Y-1.5Re.

It is also possible for a thermal barrier coating, which is preferably the outermost layer and consists for example of $ZrO_2$, $Y_2O_3$—$ZrO_2$, i.e. unstabilized, partially stabilized or fully stabilized by yttrium oxide and/or calcium oxide and/or magnesium oxide, to be present on the MCrAlX.

The thermal barrier coating covers the entire MCrAlX layer. Columnar grains are produced in the thermal barrier coating by suitable coating processes, such as for example electron beam physical vapor deposition (EB-PVD).

Other coating processes are possible, for example atmospheric plasma spraying (APS), LPPS, VPS or CVD. The thermal barrier coating may include grains that are porous or have micro-cracks or macro-cracks, in order to improve the resistance to thermal shocks. The thermal barrier coating is therefore preferably more porous than the MCrAlX layer.

Refurbishment means that after they have been used, protective layers may have to be removed from components 120, 130 (e.g. by sand-blasting). Then, the corrosion and/or oxidation layers and products are removed. If appropriate, cracks in the component 120, 130 are also repaired. This is followed by recoating of the component 120, 130, after which the component 120, 130 can be reused.

The blade or vane 120, 130 may be hollow or solid in form. If the blade or vane 120, 130 is to be cooled, it is hollow and may also have film-cooling holes 418 (indicated by dashed lines).

I claim:

1. A layer system comprising:
    a two-layered NiCoCrAlY layer including a bottom NiCoCrAlY layer and an outer NiCoCrAlY layer on the bottom layer,
    wherein a chromium content of the bottom NiCoCrAlY layer is 10% by weight to 12% by weight lower than a chromium content of the outer NiCoCrAlY layer,
    wherein a cobalt content of the bottom NiCoCrAlY layer and a cobalt content of the outer NiCoCrAlY layer are the same or differ by no more than 1.5% by weight,
    wherein an aluminum content of the outer NiCoCrAlY layer is less than an aluminum content of the bottom NiCoCrAlY layer, and
    wherein the aluminum content of the outer NiCoCrAlY layer is at least 0.5% by weight and at most by 1% by weight less than the aluminum content of the bottom NiCoCrAlY layer.

2. The layer system as claimed in claim 1,
    wherein the cobalt content of the bottom NiCoCrAlY layer and the cobalt content of the outer NiCoCrAlY layer each comprise from 24% by weight to 25.5% by weight cobalt.

3. The layer system as claimed in claim 1,
    wherein the aluminum content of the bottom and outer layers each comprise from 10.5% by weight to 11.5% by weight.

4. The layer system as claimed in claim 1, wherein a yttrium content of the bottom NiCoCrAlY layer is the same as a yttrium content of the outer NiCoCrAlY layer.

5. The layer system as claimed in claim 4, wherein the yttrium content of the bottom and outer layers are each 0.2% by weight to 0.6% by weight.

6. The layer system as claimed in claim 1,
    wherein the bottom NiCoCrAlY layer includes the following composition (in % by weight):
    cobalt: 24%-25.5%,
    chromium: 12%-14%,
    aluminum: 10.0%-12.0%,
    yttrium: 0.2%-0.4%, and
    remainder nickel.

7. The layer system as claimed in claim 1,
    wherein the outer NiCoCrAlY layer includes the following composition (in % by weight):
    cobalt: 24%-25.5%,
    chromium: 23%-25%,
    aluminum: 9.5%-11.5%,
    yttrium: 0.2%-0.4%, and
    remainder nickel.

8. The layer system as claimed in claim 1,
    further comprising a thermally grown oxide layer on the outer NiCoCrAlY layer.

9. The layer system as claimed in claim 1,
    further comprising a thermal barrier coating layer on the outer NiCoCrAlY layer.

10. The layer system as claimed in claim 1,
    wherein the two-layered NiCoCrAlY layer has a thickness of 180 µm to 300 µm.

11. The layer system as claimed in claim 1, wherein the layer system comprises no rhenium in the outer and bottom layers.

12. A layer system comprising:
    a bottom NiCoCrAlY layer comprising the following composition (in % by weight):
    cobalt: 24%-25.5%,
    chromium: 12%-14%,
    aluminum: 10.0%-12.0%,
    yttrium: 0.2%-0.4%, and
    remainder nickel; and
    a top NiCoCrAlY layer on the bottom NiCoCrAlY layer that comprises the following composition (in % by weight):
    cobalt: 24%-25.5%,
    chromium: 23%-25%,
    aluminum: 9.5%-11.5%,
    yttrium: 0.2%-0.4%, and
    remainder nickel,
    wherein an aluminum content in the top layer is less than an aluminum content in the bottom layer.

13. A layer system comprising:
    a bottom NiCoCrAlY layer and a top NiCoCrAlY layer on the bottom NiCoCrAlY layer,
    wherein a chromium content of the top NiCoCrAlY layer is 23%-25% by weight, wherein a chromium content of the bottom NiCoCrAlY layer is 12%-14% by weight,
wherein a cobalt content of the bottom NiCoCrAlY layer and a cobalt content of the top NiCoCrAlY layer are each 24%-25.5% by weight,
wherein an aluminum content of the top NiCoCrAlY layer is less than an aluminum content of the bottom NiCoCrAlY layer, and
wherein the aluminum content of the top NiCoCrAlY layer is at least 0.5% by weight and at most by 1% by weight less than the aluminum content of the bottom NiCoCrAlY layer.

\* \* \* \* \*